(12) United States Patent
Chass

(10) Patent No.: US 6,310,472 B1
(45) Date of Patent: Oct. 30, 2001

(54) MULTIPLE HALL EFFECT SENSOR OF MAGNETIC CORE DISPLACEMENT

(76) Inventor: Jacob Chass, 70-25 Yellowstone Blvd., Forest Hills, NY (US) 11375

( * ) Notice: Subject to any disclaimer, the term of this patent is extended or adjusted under 35 U.S.C. 154(b) by 0 days.

(21) Appl. No.: 09/549,312

(22) Filed: Apr. 13, 2000

(51) Int. Cl.[7] ...................................................... G01B 7/14
(52) U.S. Cl. .................................. 324/207.2; 324/207.17; 324/207.24
(58) Field of Search .......................... 324/207.16–207.21, 324/207.24, 235, 251; 340/870.32–870.36; 336/45

(56) References Cited

U.S. PATENT DOCUMENTS

| | | | |
|---|---|---|---|
| 3,152,261 | * 10/1964 | Carlstein | 324/207.2 X |
| 3,243,692 | * 3/1966 | Heissmeier et al. | 324/207.2 X |
| 4,387,339 | * 6/1983 | Akerblom | 324/207.18 |
| 4,471,304 | * 9/1984 | Wolf | 324/207.24 |
| 4,623,840 | * 11/1986 | Fujimura et al. | 324/207.18 X |

* cited by examiner

Primary Examiner—Gerard R. Strecker
(74) Attorney, Agent, or Firm—Pitney, Hardin, Kipp & Szuch LLP

(57) ABSTRACT

A sensor for measuring linear displacement has a core of magnetic material disposed for movement within a bobbin about which at least one coil of insulated, electrically conductive wire is wound. At least one Hall effect device is included in the sensor. The sensor is contained with a magnetic shell. When the coil is excited by a DC power source, the magnitude or direction of magnetic flux flowing through Hall effect device is dependent upon the position of the core.

16 Claims, 6 Drawing Sheets

MULTIPLE HALL EFFECT SENSOR OF MAGNETIC CORE DISPLACEMENT

CROSS REFERENCE

United States Patents:
U.S. Pat. No. 4,807,516 Feburary 1989 Takats
U.S. Pat. No. 4,107,604 August 1978 Brenier
U.S. Pat. No. 4,319,236 March 1982 Brace, Balmer
U.S. Pat. No. 4,322,709 March 1982 Vonder, Petkewicz

BACKGROUND OF THE INVENTION

The present invention relates to linear displacement sensors and in particular to Hall effect linear displacement sensor utilizing DC input power and providing DC output. The sensor translates a variable linear core displacement to one or more DC outputs. Multiple output sensors find use as primary control elements in aircraft and other applications requiring one or more output signals. Heretofore the prevalent sensor for such applications consists of several linear variable differential transformers (LVDTs) assembled in parallel configuration.

Such a system is shown in U.S. Pat. No. 4,807,516 to Imre Takats. This patent discloses an aircraft flight control system employing three controllers operating as dual actuators. FIG. 1 of Takats depicts two dual LVDT assemblies which are AC devices requiring an AC power source for input power excitation and requiring a demodulator for output voltage measurement. Each of the LVDTs requires a separate core-rod assembly and parallel core-rod assemblies are attached to a yoke containing a ball bearing assembly for attachment to a single rod. Many aircraft control system include dual, triple or quadruple LVDT systems.

The prior art also includes a lateral displacement of a permanent magnet inducing a flux flow through a Hall effect device which in turn generates an output voltage indicative of the position of the permanent magnet with respect to the Hall effect device. Such arrangements are generally taught in U.S. Pat. Nos. 4,319,236 ; 4,107,604 and 4,322,709. The later reference relies on a magnetic circuit having a variable air gap with an increasing magnetic flux density used to activate a switch.

SUMMARY OF THE INVENTION

It is the object of the present invention to provide a displacement sensor which eliminates the need for the AC power supply, demodulator and elaborate mechanical rod assembly required of prior art.

A further object is to provide such a sensor which has a DC input and provides a DC output and one in which a single rod may be used to provide more than one output voltage.

A still further object is to provide a sensor that is not susceptible to external demagnetization of its magnetic element by utilizing a core made of soft magnetic material rather than a permanent magnet.

Still another object is to provide a core position sensor whose output voltage magnitude and polarity may be adjusted over its displacement range by varying the coil excitation voltage, whose design is relatively simple small in size and inexpensive to produce.

The above objects and advantages are attained in accordance with the present invention by providing a Hall effect magnetic core displacement sensor comprised of an electrical sensing assembly and a core-rod assembly contained within a shell of magnetic material. The electrical sensing assembly consists of a bobbin of non-magnetic material about which winding of electrically conductive, insulated wire is wound and at least one Hall effect device disposed within the magnetic flux path. The core consists of soft magnetic material in the form of a cylinder that is attached to a cylindrical rod made of non-magnetic material.

BRIEF DESCRIPTION OF THE INVENTION

The invention may be best understood by reference to the accompanying drawings wherein, like parts in each of the following figures, are identified by the same number or character reference, and wherein:

FIG. 1 provides a schematic illustration, in partial section, the first embodiment of the invention.

FIG. 2 illustrates front view of the sensor assembly, in section, along line 2—2 of FIG. 1 in the direction of the arrows.

FIG. 3 provides a schematic illustration, in section, the second embodiment of the invention.

Figure 8:
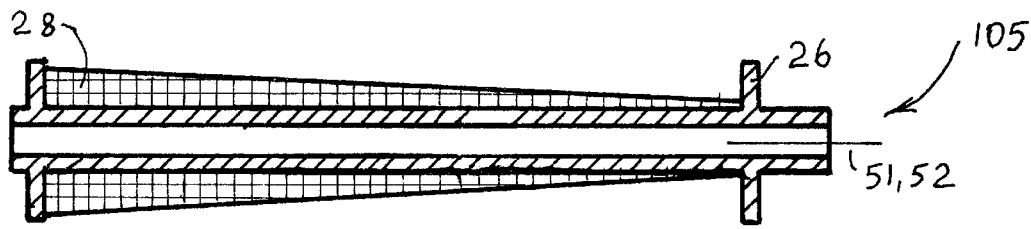

FIG. 8 provides a schematic illustration, in section, the bobbin-winding assembly utilized in the first embodiment of the invention.

Figure 9:
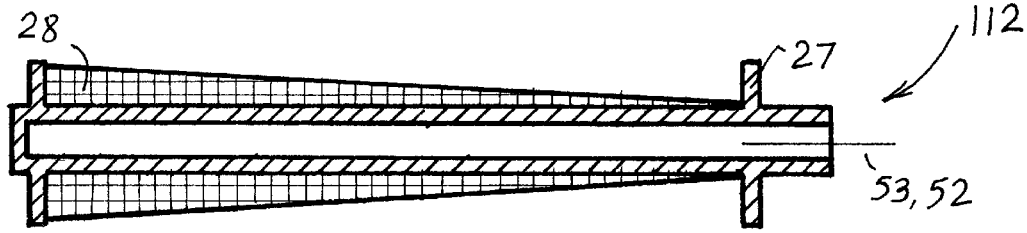

FIG. 9 provides a schematic illustration, in section, the bobbin-winding assembly utilized in the second embodiment of the invention.

Figure 10:
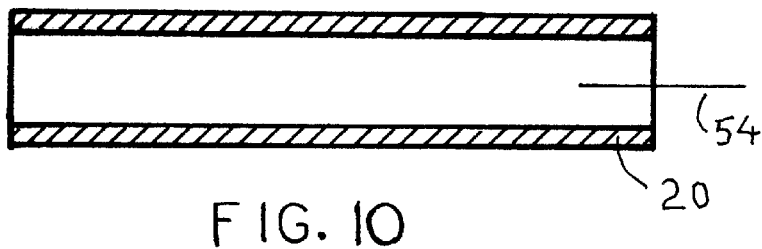

FIG. 10 illustrates the side view, in section, of the magnetic shell utilized in the invention.

Figure 11:
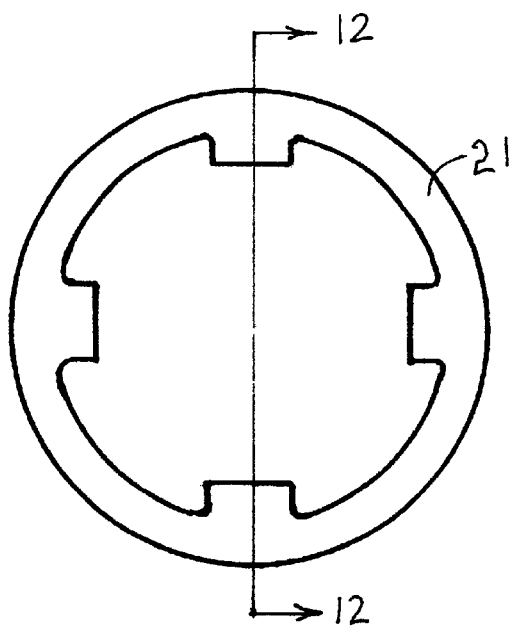

FIG. 11 illustrates the front view of the magnetic emitter utilized in the invention.

Figure 12:
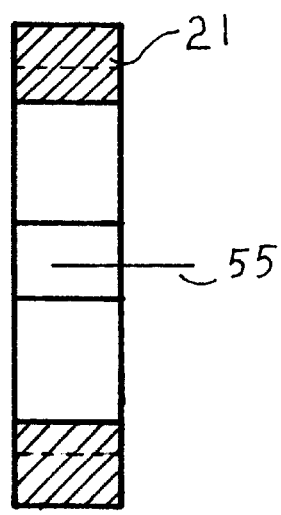

FIG. 12 illustrates side view, in section, along the line 12—12 of FIG. 11 in the direction of the arrows, the magnetic emitter utilized in the invention.

Figure 13:
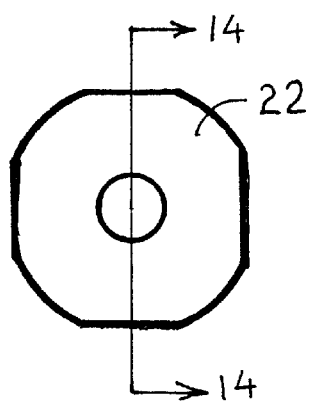

FIG. 13 illustrates the front view of the magnetic collector utilized in the invention.

Figure 14:
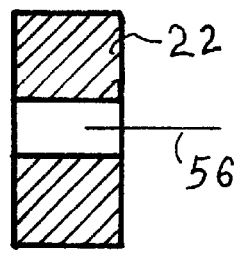

FIG. 14 illustrates side view, in section, along the line 14—14 of FIG. 13 in the direction of the arrows, the magnetic collector.

Figure 15:
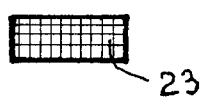

FIG. 15 provides a schematic illustration, in section, the Hall effect device utilized in the invention.

Figure 16:
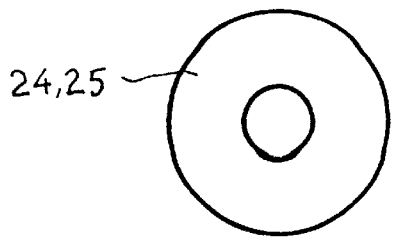

FIG. 16 illustrates front view of non-magnetic washer 24 and washer 25, utilized in the first embodiment and the second embodiment of the invention.

Figure 17:
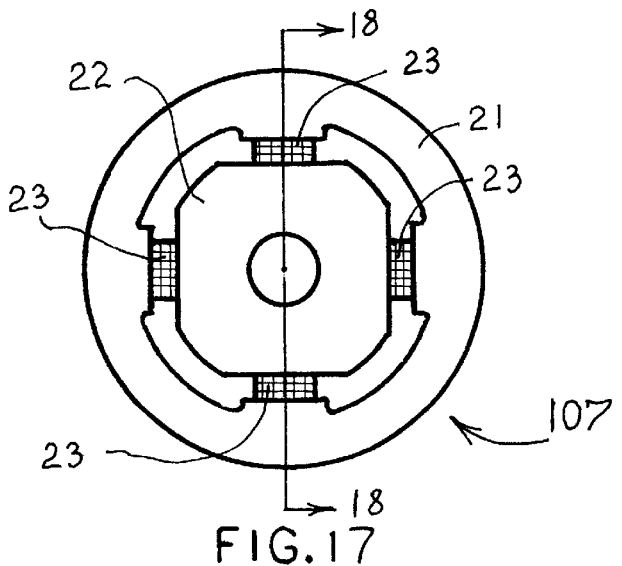

FIG. 17 provides a schematic illustration of Hall effect assembly 107 consisting of Hall effect device 23, (FIG. 15), magnetic emitter 21 (FIG. 11), and magnetic collector 22 (FIG. 13).

Figure 18:
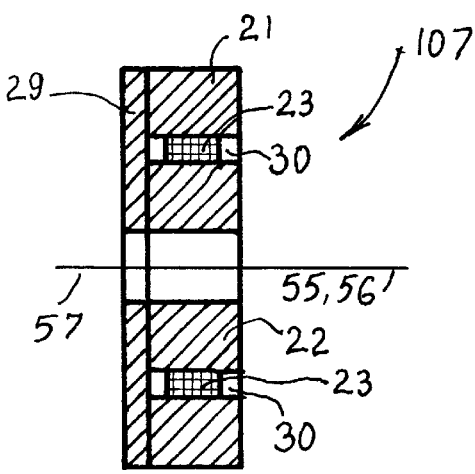

FIG. 18 provides a schematic illustration, side view, in section of Hall effect assembly 107, along the line 18—18 of FIG. 17 in the direction of the arrows.

Figure 19:
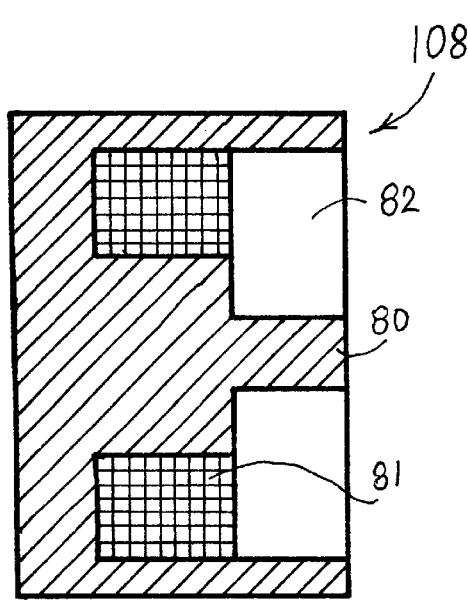

FIG. 19 provides a schematic illustration, side view, in section of a test fixture utilized to test Hall effect devices assembly 107.

Figure 20:
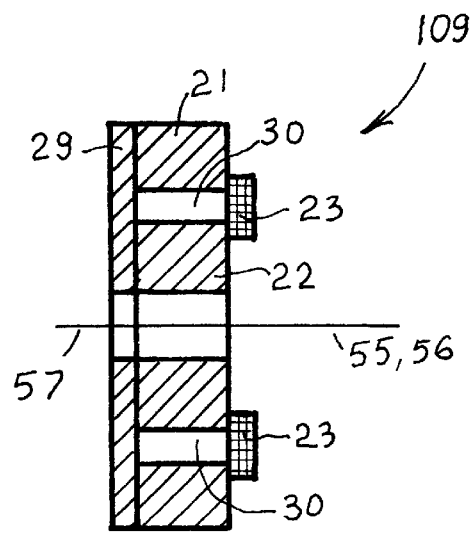

FIG. 20 provides a schematic illustration, side view, in section, of an alternate Hall effect devices assembly 109.

Figure 21:
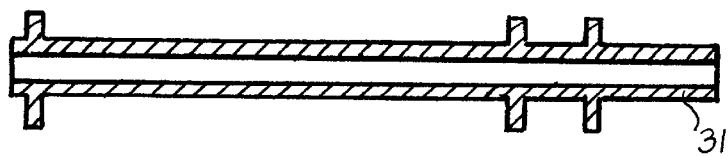

FIG. 21 illustrates side view, in section of bobbin 31, used in sensor 113.

Figure 22:
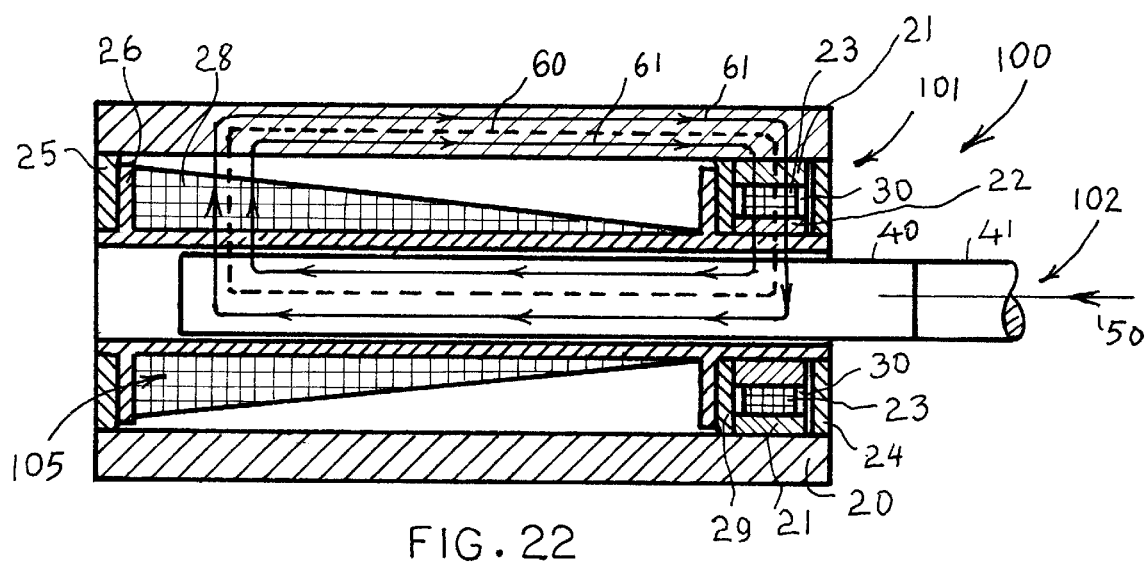

FIG. 22 provides a schematic illustration, side view, in section of the magnetic circuit and magnetic flux flow applied to the first and second embodiment of the invention.

Figure 23:
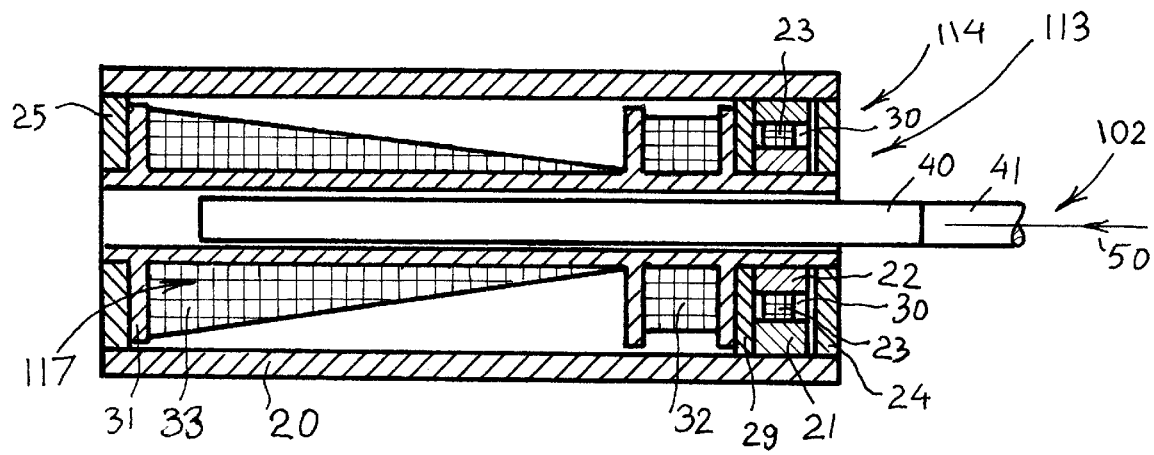

FIG. 23 provides a schematic illustration, side view in section, modification of the first embodiment of the invention.

Figure 24:
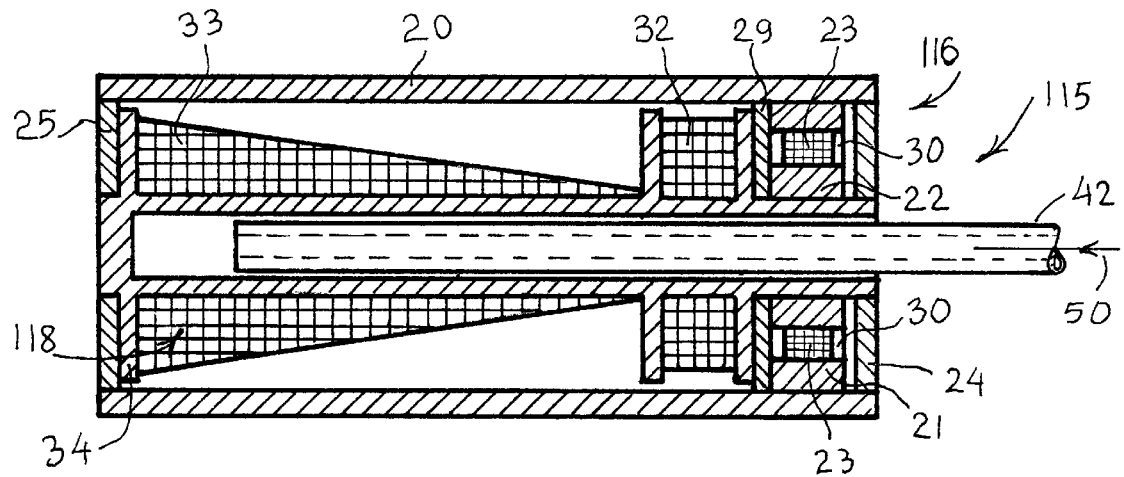

FIG. 24 provides a schematic illustration, side view in section, modification of the second embodiment of the invention.

Figure 25:
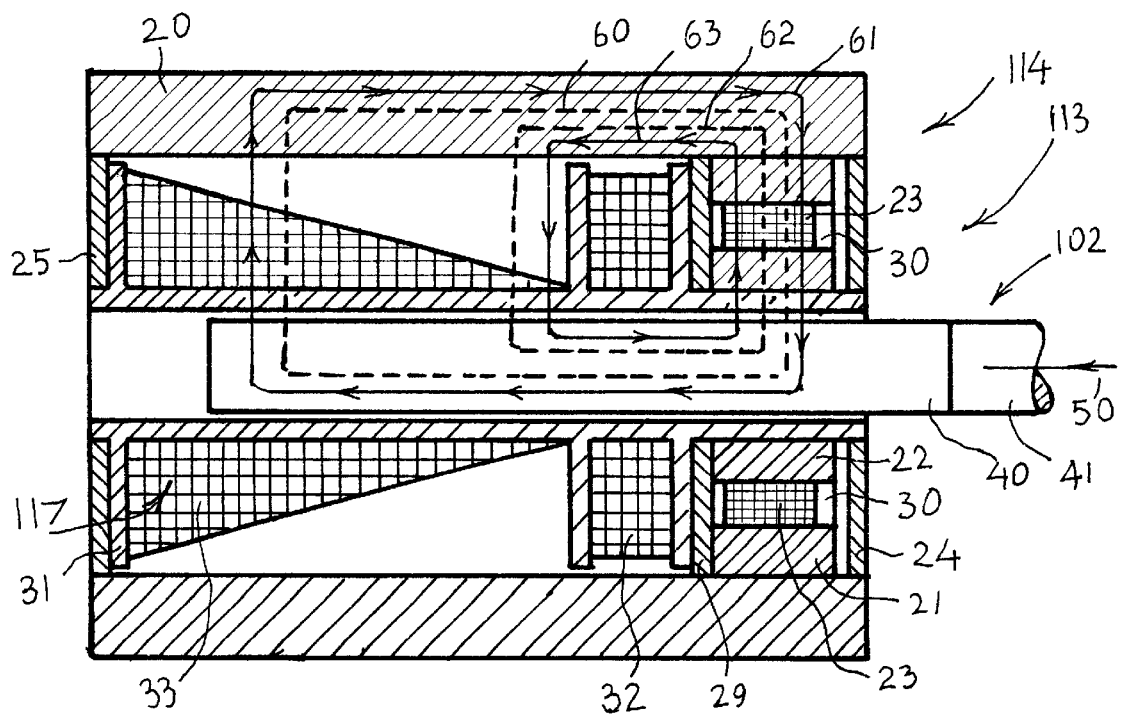

FIG. 25 illustrates magnetic circuits and flux paths applied to the sensors in FIG. 23 and FIG. 24.

Although the invention has been described with specific reference to the two embodiments and modifications thereof, it will be apparent to knowledgeable person, upon reading this patent, that numerous modifications and alternative materials and arrangements may be devised by those skilled in the art, without departing from the spirit and scope of the invention as defined by the appended claims.

DETAILED DESCRIPTION OF THE PREFERRED EMBODIMENT

Figure 1:
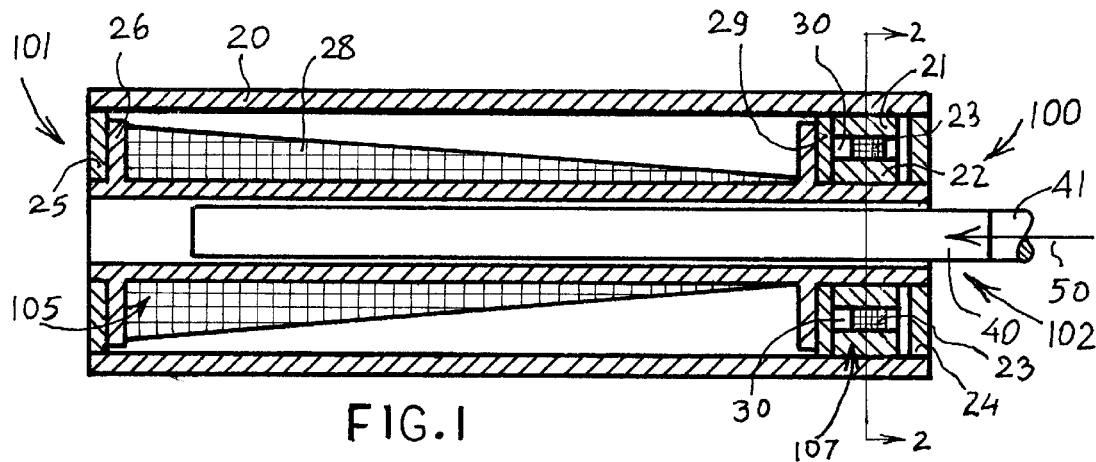
Figure 2:
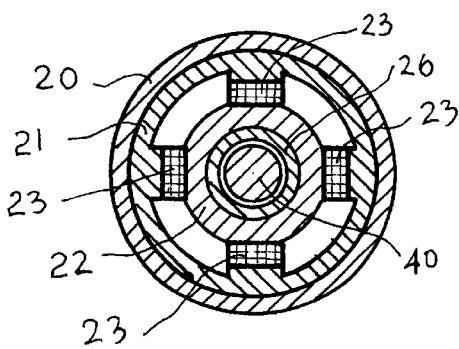

Reference is now made to the drawings and to FIG. 1, 2 in particular wherein a linear displacement sensing device 100 is depicted which translates a displacement of a core into a DC output. The sensor 100 consists of an electrical sensing assembly 101 and core-rod assembly 102 (shown in FIG. 4).

The electrical sensing assembly 101 consists of a hollow bobbin-winding assembly 105 (shown in FIG. 8) and Hall effect device holder assembly 107 (shown in FIG. 17, 18) contained within magnetic shell 20 (shown in FIG. 10).

Figure 6:
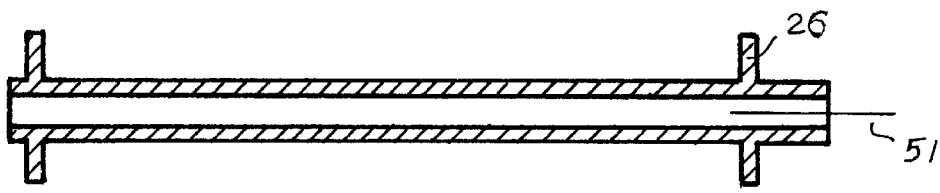
FIG. 6 illustrates side view, in section, of the bobbin utilized in the first embodiment of the invention.

The bobbin-winding assembly 105 is made of a cylindrical hollow bobbin 26 about which winding 28 of insulated electrically conductive wire is wound so that bobbin axis 51 and winding axis 52 substantially coincide as may be seen in FIG. 6 and 8. It should be appreciated that the winding density along the winding axis 52 need not be uniform.

Reference is now made to FIG. 17, 18 and 20 in which Hall effect device holder assemblies 107 and 109 are depicted. Holder 107 (FIG. 17, 18) consists of Hall effect devices 23, magnetic emitter 21 shown in FIG. 11, 12, magnetic collector 22 shown in FIG. 13, 14, and non-magnetic disc 29 (FIG. 18). Magnetic emitter 21 and magnetic collector 22 are firmly attached to non-magnetic disc 29 so that axis 55 (FIG. 12 ), axis 56 (FIG. 14 ) and axis 57 of non-magnetic disc 29 substantially coincide as may be seen FIG. 18. A uniform air gap is 30 is formed (FIG. 18 ) wherein Hall effect devices 23 are firmly attached (FIG. 17, 18).

Referring to FIG. 20, Hall effect device holder 109 depicted in FIG. 20 is identical to holder 107 FIG. 17, 18 except that Hall effect devices 23 are firmly attached about air gap 30.

Figure 4:
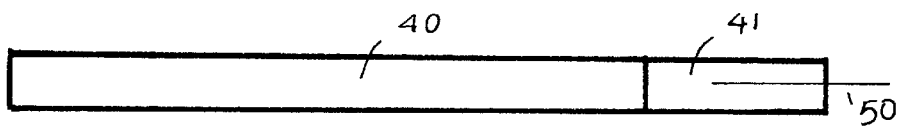
FIG. 4 illustrates side view of the core-rod assembly utilized in the first embodiment of the invention.

The core-rod assembly 102 is shown in FIG. 4. The core-rod assembly 102 consists of core 40 formed of a soft magnetic material (not a permanent magnet) firmly attached to one end of rod 41. Rod 41 is formed of non-magnetic material.

Referring back to FIG. 1. It can be seen that the assembled linear displacement sensing device 100 consists of bobbin-winding assembly 105, Hall effect device holder 107 secured within magnetic shell 20 and firmly closed by non-magnetic washers 24 and 25. The core-rod assembly is disposed for longitudinal movement along the hollow core of the bobbin.

Figure 3:
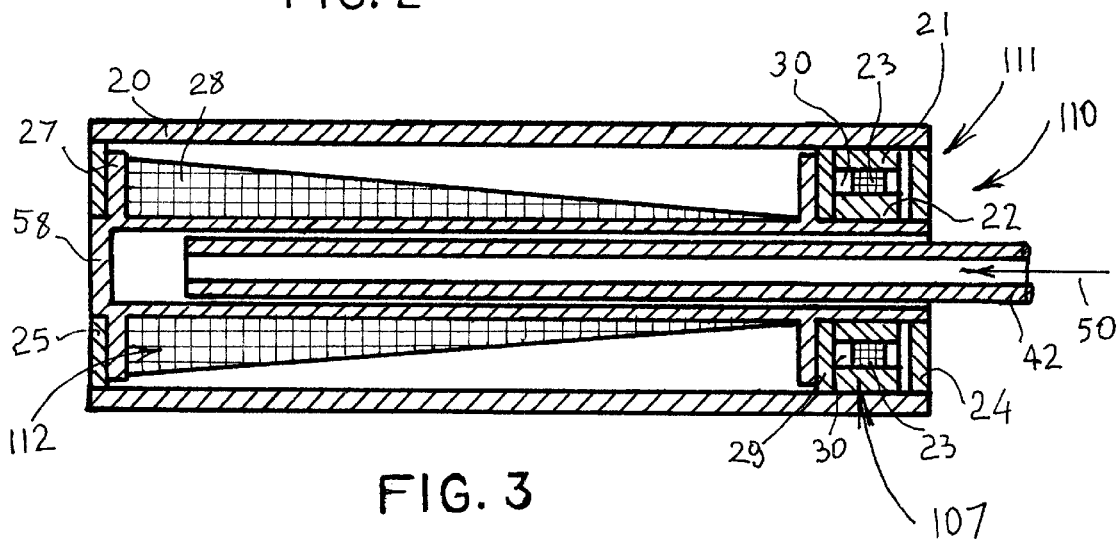

Reference is now made to FIG. 3 wherein a second embodiment 110 of a sensor in accordance with the present invention is depicted. The basic components of sensor 110 are the same as those of sensor 100 and hence bear the same reference numerals and no further explanation is required. The differences are in the construction of the electrically sensing assembly 111 and core-rod 42.

Figure 7:
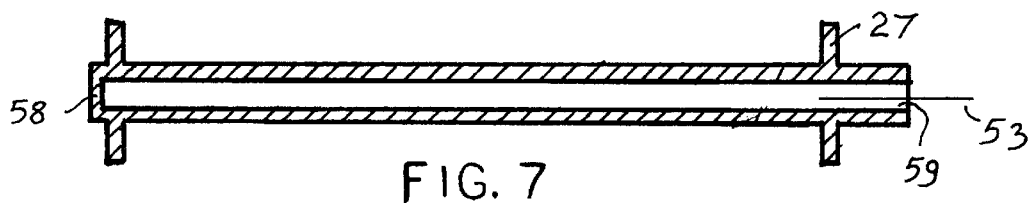
FIG. 7 illustrates side view, in section, of the bobbin utilized in the second embodiment of the invention.

Accordingly, as shown in FIG. 9, bobbin-winding assembly 112 (FIG. 9) consists of bobbin 27 (FIG. 7) and winding 28. As shown bobbin 27 has a closed end 58 which substantially coincides with the flat sides to close one end 25 and an open end 59 which extends through the opposite end washer 24.

Figure 5:
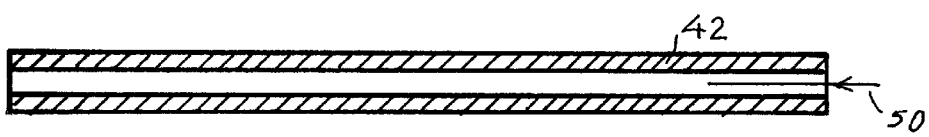
FIG. 5 illustrates side view, in section, of the core utilized in the second embodiment of the invention.

The core 42 (FIG. 5 ) is a hollow rod made of soft magnetic material (not a permanent magnet). When core 42 is positioned within bobbin 27 the hollow core allows back-flow of fluid or gas within the hollow-core bobbin 27 as core 42 is axially displaced into bobbin 27 (in the direction of arrow 50).

Referring back to assembly 108 (FIG. 19). It is a test fixture utilized for testing Hall effect devices holders 107 and 109. It consists of magnetic container 80 and an annular coil 81. The test is performed by placing assembly 107 or assembly 109 within cavity 82, apply DC current to coil 81 and monitor Hall effect devices DC output for complying to said sensors specifications.

Reference is now made to FIG. 23 wherein a modification of the first embodiment 113 of a sensor in accordance with the present invention is depicted. The basic components of sensor 113 are the same as those of sensor 100 and hence bear the same reference numerals and no further explanation is required. The differences are in the construction of the electrical sensing assembly 114. Accordingly, as shown in FIG. 23, bobbin-winding assembly 112 was replaced by bobbin-winding assembly 117. Bobbin-winding assembly 117 consists of bobbin 31 (FIG. 21), winding 32 and winding 33. Said coils are connected in series, in opposition to each other.

Reference is now made to FIG. 24 wherein a modification of the second embodiment 115 of a sensor in accordance with the present invention is depicted. The basic components of sensor 115 are the same as those of sensor 110 (FIG. 3) and hence bear the same reference numerals and no further explanation is required. The differences are in the construction of the electrical sensing assembly 116. Accordingly, as shown in FIG. 24, bobbin-winding assembly 112 was replaced by bobbin-winding assembly 118. Bobbin-winding assembly 118 consists of bobbin 34 (FIG. 24), winding 32 and winding 33. Said winding are connected in series, in opposition to each other.

Core 40 and core 42 are machined generally of a metal tube made of magnetic material. The rod 41 is machined of non-magnetic material. The core 40 is firmly attached at one end of the rod 41. Bobbins 26, 27, 31 and 34 are made of non-magnetic material. Winding 28, 32 and 33 are wound of insulated, electrically conductive wire, about said bobbins.

Emitter 21, and collector 22 are installed within cavity 82 of test fixture 108 (FIG. 19) forming air-gap 30. Hall effect devices 23 are deposited within air-gap 30. DC input is gradually applied to coil 81, generating magnetic flux flow through Hall effect devices 23. DC output voltage of Hall effect devices is monitored and checked for conforming to sensor specification requirements. Upon conformation, Hall effect devices are firmly attached within air-gap 30. Disk 29 is firmly attached as shown in FIG. 18 forming assembly 107.

Referring back to FIG. 1. Washer 25, bobbin-winding assembly 105, Hall effect device holder assembly 107 and washer 24 are firmly attached within magnetic shell 20 forming electrical sensing assembly 101. Axes 51, 52, 54, 55, 56 and 57 substantially coincide. The core-rod assembly 102 is disposed for movement within the hollow-core of bobbin 26 forming sensor 100. The assembly procedure of sensors 110, 113 and 115 is substantially the same as described above.

FIG. 22 illustrates the magnetic circuit 60 that results from depositing core 40 within bobbin-winding 105. Magnetic flux flow 61 results from DC excitation of winding 28. The magnetic flux flows from core 40 to magnetic shell 20 to emitter 21 through Hall effect device 23 to collector 22 and back to core 40. Displacement of core 40 in the direction 50 within winding 28 will cause an increase in the magnitude of magnetic flux 61, due to an increase in the number of magnet wire turns encircling core 40. The magnetic flux flowing through Hall effect device 23 will generate DC output. The magnitude of the DC output serves to indicate the axial position of core-rod assembly 102 in relation to the electrical sensing assembly 101. The performance of sensor 110 is the same as sensor 100 and no further explanation is required.

FIG. 25 illustrates sensor 113 which is a modified sensor 100. The modifications in sensor 100 are in bobbin-winding assembly 105 (FIG. 8). Bobbin 31 (FIG. 21) was substituted for bobbin 26 (FIG. 6) winding 32 was added and winding 33 was substituted for winding 28 (FIG. 8). Winding 32 and winding 33 are connected in series in opposition to each other. Magnetic circuits 60 and 62 are resulted from placing core 40 within bobbin-winding assembly 117. Magnetic flux flow 61 flows in magnetic circuit 60 and its due to the excitation of winding 33. Magnetic flux flow 63 flows in magnetic circuit 62 and it is due to the excitation of winding 32. Said flux flows will flow in opposite direction since winding 32 and winding 33 are connected in series in opposition to each other. Magnetic flux 61 flows in magnetic circuit 60 from core 40 to magnetic shell 20 to magnetic emitter 21 through Hall effect device 23 to magnetic collector 22 and back to core 40. Magnetic flux flow 63 flows in magnetic circuit 62 from core 40 to magnetic collector 22 through Hall effect device 23 to magnetic emitter 21 to magnetic shell 20 and back to core 40. The direction of magnetic flux 61 flowing in magnetic circuit 60 is defined as positive, generating a positive DC Hall effect device output. The direction of magnetic flux 63 flowing in magnetic circuit 62 is defined as negative, generating a negative DC Hall effect device output. When core 40 least penetrates the bobbin Hall effect device DC output will be negative since the magnitude of magnetic flux 61 is zero. As core 40 is displaced in the direction 50 the number of magnet wire turns encircling core 40 will increase causing an increase in the magnitude of the negative DC output. When core 40 least penetrates winding 33 magnetic flux 61 will be generated and the magnitude of negative DC output will decrease. Further displacement of core 40 in direction 50 may cause Hall effect device DC output to be zero. Further displacement of core 40 in the direction 50 will increase the number of magnet wire turns encircling core 40 while the number of turns of winding 32 encircling core 40 remain constant.

Therefore, Hall effect device DC output will be positive.

Referring back to FIG. 11. Magnetic emitter 21 is defined as Outer annular magnetic member.

Referring back to FIG. 13 Magnetic collector 22 is defined as Inner annular magnetic member.

What is claimed is:

1. A displacement measuring sensor comprising:

an elongated bobbin of non-magnetic material, said bobbin having a hollow hub; electrical winding having at least one coil wound of insulated, electrically conductive wire disposed about said bobbin producing at least one bobbin winding assembly such that said bobbin winding assembly has an ability to receive a direct current excitation;

an elongated core of magnetic material movably disposed within said hollow hub of said bobbin winding assembly, said elongated core producing a magnetic flux flow upon said direct current excitation of said bobbin winding assembly;

an elongated housing, said housing consisting, generally, of a magnetic shell and two washers of non-magnetic material; said bobbin-winding assembly rigidly disposed within said housing; axes of said housing, and said bobbin-winding assembly substantially coincide; axial length of said housing and axial length of said bobbin-winding assembly are generally the same;

an inner annular magnetic member disposed about and rigidly attached to the periphery of said bobbin, generally, at an end portion of said bobbin;

a outer annular magnetic member disposed about said inner annular magnetic member; said outer annular magnetic member surrounding said inner annular magnetic member;

said inner annular magnetic member and said outer annular magnetic member are concentric, forming a radial, substantially uniform, air-gap; periphery of said outer annular magnetic member rigidly attached to inner surface of said magnetic shell, generally, at an end portion of said shell;

at least one Hall effect drive rigidly attached within said air-gap, said Hall effect device generating a direct current output in relation to said magnetic flux flow thereby providing a measuring factor for a displacement of said elongated core.

2. The invention in accordance with claim 1 wherein said Hall effect is rigidly attached at a boundary of said air-gap.

3. The invention in accordance with claim 1 wherein said bobbin is made of non- magnetic stainless steel.

4. The invention in accordance with claim 2 wherein said bobbin is made of non-magnetic stainless steel.

5. A displacement measuring sensor comprising:

an elongated bobbin of non-magnetic material, said bobbin having a hollow hub and wherein one end of said bobbin is closed; electrical winding, having at least one coil wound of insulated, electrically conductive wire, disposed about said bobbin, producing at least one bobbin-winding assembly such that said bobbin winding assembly has an ability to receive a direct current excitation;

an elongated core of magnetic material tubing movably disposed within said hollow hub of said bobbin-winding assembly, said elongated core producing a magnetic flux flow upon said direct current excitation;

an elongated housing, said housing consisting, generally, of a magnetic shell and two washers of non-magnetic material; said bobbin-winding assembly rigidly disposed within said housing; axes of said housing and said bobbin-winding assembly substantially coincide; axial length of said housing and axial length of said bobbin-winding assembly are generally the same;

an inner annular magnetic member disposed about and rigidly attached to the periphery of said bobbin, generally, at an end portion of said bobbin opposite said closed end of said bobbin;

an outer annular magnetic member disposed about said inner annular magnetic member; said outer annular magnetic member surrounding said inner annular magnetic member;

said Inner annular magnetic member and said outer annular magnetic member are concentric, forming a radial, substantially uniform, air-gap; periphery of said outer annular magnetic member rigidly attached to inner surface of said magnetic shell, generally, at an end portion of said shell opposite said closed end of said bobbin;

at least one Hall effect device rigidly attached within said air-gap, said Hall effect device generating a direct current output in relation to said magnetic flux flow thereby providing a measuring factor for a displacement of said elongated core.

6. The invention in accordance with claim 5 wherein said Hall effect device is rigidly attached at a boundary of said air-gap.

7. The invention in accordance with claim 5 wherein said bobbin is made of non-magnetic stainless steel.

8. The invention in accordance with claim 6 wherein said bobbin is made of non-magnetic stainless steel.

9. The invention in accordance with claim 5 wherein said core is made of magnetic material rod.

10. The invention in accordance with claim 9 wherein said bobbin is made of non-magnetic stainless steel.

11. The invention in accordance with claim 1 wherein said electrical winding comprising of two coils; said two coils connected in series opposition relationship.

12. The invention in accordance with claim 5 wherein said electrical winding comprising of two coils; said two coils connected in series opposition relationship.

13. The invention in accordance with claim 11 wherein said Hall effect device is rigidly attached at a boundary of said air-gap.

14. The invention in accordance with claim 12 wherein said Hall effect device is rigidly attached at a boundary of said air-gap.

15. The invention in accordance with claim 11 wherein said bobbin is made of non-magnetic stainless steel.

16. The invention in accordance with claim 12 wherein said bobbin is made of non-magnetic stainless steel.

\* \* \* \* \*

UNITED STATES PATENT AND TRADEMARK OFFICE
CERTIFICATE OF CORRECTION

PATENT NO. : 6,310,472 B1
DATED : October 30, 2001
INVENTOR(S) : Jacob Chass

It is certified that error appears in the above-identified patent and that said Letters Patent is hereby corrected as shown below:

Claim 1,
Line 36, change "drive" to -- device --.

Claim 2,
Line 2, after "effect" add -- device --.

Claim 5,
Line 29, change "Inner" to -- inner --.

Signed and Sealed this

Sixteenth Day of April, 2002

Attest:

JAMES E. ROGAN
*Attesting Officer*    *Director of the United States Patent and Trademark Office*